United States Patent [19]

Baldwin et al.

[11] 3,781,017

[45] Dec. 25, 1973

[54] CASSETTE PLAYER

[75] Inventors: Douglas S. Baldwin, Longmont; Kenneth E. Benton, Broomfield; Vincent L. Jacques, Longmont, all of Colo.

[73] Assignee: International Business Machines Corporation, Armonk, N.Y.

[22] Filed: Mar. 10, 1971

[21] Appl. No.: 122,891

[52] U.S. Cl. .................... 274/4 C

[51] Int. Cl. .................... G11b 5/00

[58] Field of Search .................... 274/4 C, 4 E, 4 F, 274/4 G; 242/198; 226/90, 180; 179/100.2 CA, 100.2 Z

[56] References Cited

UNITED STATES PATENTS

| | | | |
|---|---|---|---|
| 3,419,226 | 12/1968 | Sato | 274/4 E |
| 3,495,835 | 2/1970 | Laa | 274/4 E |
| 3,591,267 | 7/1971 | Kakiuchi | 274/4 A |
| 3,603,595 | 9/1971 | Wada | 274/4 E |
| 3,638,953 | 2/1972 | Kodama | 274/4 E |

FOREIGN PATENTS OR APPLICATIONS

| | | | |
|---|---|---|---|
| 27,029 | 9/1970 | Japan | 274/4 E |

*Primary Examiner*—Harry N. Haroian
*Attorney*—Hanifin & Jancin and Herbert F. Somermeyer

[57] ABSTRACT

A single-action cassette loading and unloading mechanism is disclosed. In loading, insertion of the cassette into the cassette player cocks the ejection mechanism, actuates a cassette holddown mechanism, and moves the pinch roller and transducer into operating relationship with tape in the cassette. A single-action release mechanism, such as a push button, first moves the transducer and pinch roller out of operative engagement with the tape in the cassette, releases the cassette for ejection, and then ejects the cassette. Pivot axis of the mechanism is perpendicular to the plane of the cassette-receiving platform. A single extension spring is used to actuate mechanisms in response to a release actuation while another spring responds to cassette insertion for the single-action loading.

8 Claims, 5 Drawing Figures

INVENTORS
DOUGLAS S. BALDWIN
KENNETH E. BENTON
VINCENT L. JACQUES
BY
Herbert F. Somermeyer
ATTORNEY

CASSETTE PLAYER

BACKGROUND OF THE INVENTION

The present invention relates to magnetic tape cassette players and the like and particularly to such players having a single-action cassette receiving and ejection mechanism.

Cassette magnetic tape players and cassette motion picture devices are receiving increased popularity in the audio, pictorial, and digital fields. There have been a multitude of different variations of cassette players. Many of them load the cassette broadside; i.e., the cassette is moved parallel to the axis of rotation of the spools in the cassette while others are loaded in one or more motions. These include moving the cassette perpendicular to such axes (end-on loading) such that the tape or film in the cassette is moved against a relatively stationary operating member such as a transducer, lens, pinch roller, and the like. An advantage of the broadside load is the short loading stroke required. This short stroke makes a cassette player more amenable to automation—that is, in the automatic loading and unloading of a cassette from a plurality of cassettes in a storage array or belt, a short loading stroke simplifies constructional features in the loading and unloading mechanisms. Broadside loading also facilitates operator insertion of a cassette. A disadvantage of the end-on loading is that either the cassette must be moved in two planes of motion or the spindles must move to engage the reels within the cassette. In either event, the loading or the cassette player mechanisms become more complex and hence more expensive than is necessary.

In many prior cassette playing machines, the insertion of the cassette cocks or actuates a mechanism which later, when released, automatically or semiautomatically ejects a cassette. Cassette insertion in the prior machines was able to perform only a small number of functions. Many of the cassette-insertion actuated mechanisms were associated with the end-on loading cassette players. In such an arrangement, the transducer and the pinch roller were relatively fixed with the cassette moving into operating engagement therewith. As mentioned above, this arrangement has disadvantages when one wants to adapt the cassette player to a fully automatic machine—that is, the long stroke required for end-on loading may create problems in fully automatic mechanisms.

Other machines of simple design permitted a broadside load by pivoting the cassette as it was inserted into playing position. This is fine for operator insertion; however, if the cassette player were ever to be considered for automatic machines, then this complex loading device adds to the loading and unloading mechanism. Also, this reduces the reliability of same—that is, when moving the cassette to and from an operating position in the player, the possibility of jamming the cassette in the inoperative position is believed to be increased over a straight broadside load.

Many cassette players have had movable holders. The cassette is placed in the holder, and the cassette within the holder is moved into an operating position. This arrangement permits the spindles and the transducers to be relatively fixed. However, the cost of the movable holder is high as well as usually requiring a complex loading stroke or strokes.

Other cassette players have had parallelogram type of linkages requiring several movements and parts for loading the cassette and latching the cassette in an operating position. With the increasing competition in the cassette-player area, it is extremely important that the reliability of the cassette player be enhanced while at the same time reducing the complexity and hence the cost. It is also desirable to provide flexibility—that is, a cassette player, especially in the digital field, should be adaptable to either manual or automatic insertion/ejection of the cartridge. Such a desire dictates that the loading stroke be as simple as possible.

SUMMARY OF THE INVENTION

It is an object to provide a simplified reliable and inexpensive single-action load/unload cassette player.

A cassette player constructed in accordance with the present invention preferably receives a cassette to be loaded in a broadside manner. That is, the cassette is loaded in a simple motion parallel to the axis of rotation of the spool or spools therein. A mechanical interlinking mechanism coordinates action between movements of a transducer, pinch roller (optional feature of a cassette player construction), cassette ejector, and cassette holddown (when used). All of the members are moved into an operating position as the cassette is inserted into its operating position. Actuation of a release button, either manually or automatically, moves the members from the operating position to an ejection or loading position and substantially simultaneously ejects the cassette from its operating position. A pair of spring means are used in the mechanism, one for ejecting the cassette and the other for actuating the mechanism to the operating position.

In one embodiment of the present invention, a main pivot member has a pivot axis perpendicular to a cassette-receiving platform. A pair of linkage arms are pivotally connected to a radial outward portion of the main pivot member and are respectively connected to a pivot member of a transducer or head and to a release mechanism. An extension spring extends from the main pivot member to a pivot arm on the pinch roller. The latter provides lost motion as well as actuation of the members in one direction. A center plunger, which may be a spring, is moved downwardly by cassette insertion. This action releases one of the arms for permitting the extension spring to actuate the members to the operating position. Upon motion in the other direction, actuation of the release member counterpivots the main pivot member causing the one arm to engage the center plunger. This action releases the spring upwardly for ejecting the cassette only after the transducer and pinch roller have been moved out of engagement from the tape in the cassette.

In another version, the extension spring is replaced by a mechanical linkage having lost motion, and a spring is connected to a member to provide urging toward an operating position thereof.

The foregoing and other objects, features, and advantages of the invention will be apparent from the following more particular description of preferred embodiments of the invention, as illustrated in the accompanying drawings.

THE DRAWINGS

DETAILED DESCRIPTION

Figures 1, 4, 5:
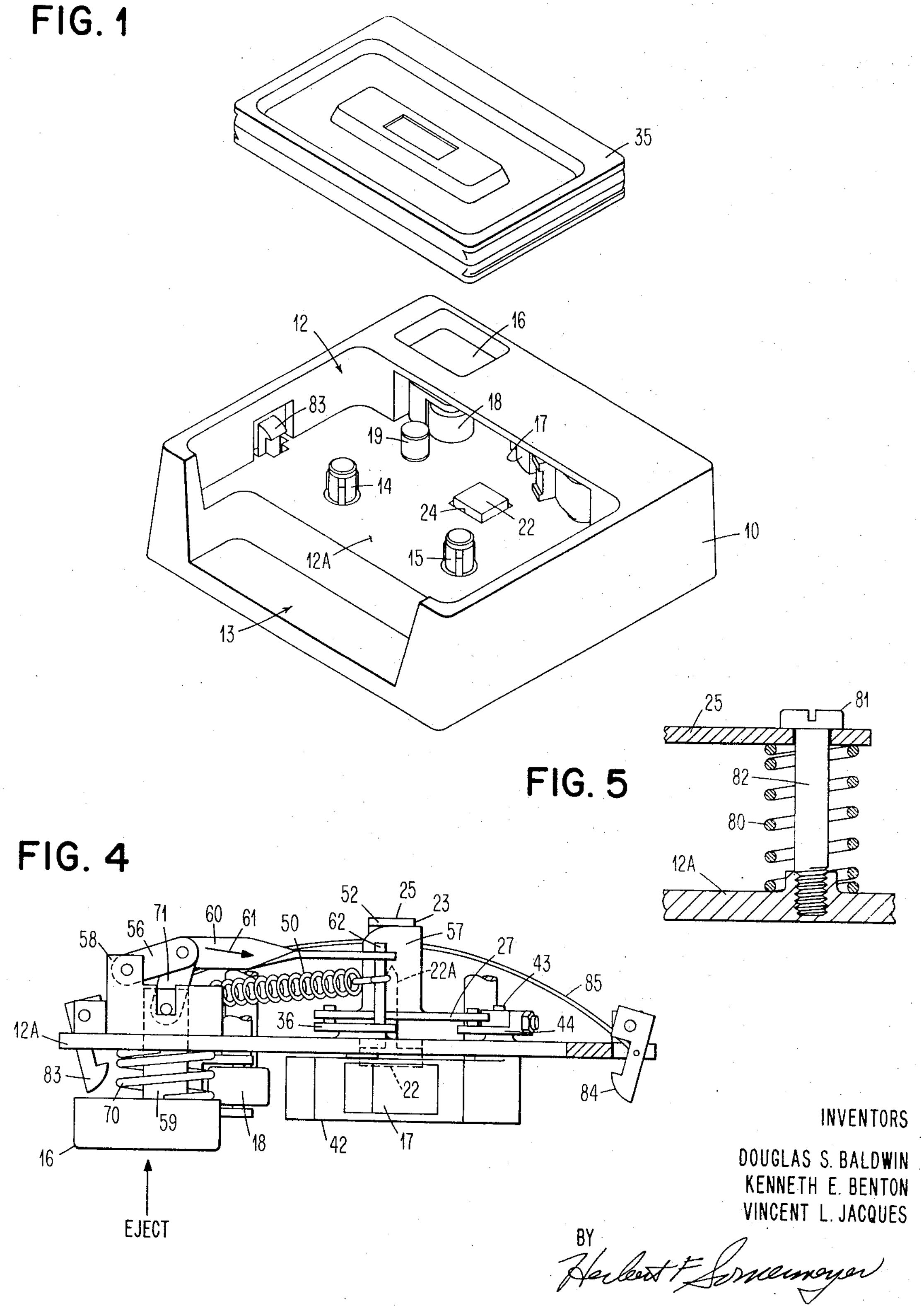
FIG. 1 is a simplified isometric showing of a cassette player and cartridge used to illustrate the invention shown ready to insert a cartridge into the player (loading position)
FIG. 4 is a simplified multilevel sectional view taken in the direction of the arrows along line 4—4 in FIG. 2.
FIG. 5 is a diagrammatic view of an apparatus for spring loading a latching arm and usable in the FIG. 1–4 illustrated apparatus.

Referring now more particularly to the drawings, like numbers and characters indicate like parts and structural features in the various views. The cassette player used to illustrate the principles of the present invention has housing 10 which also is the frame. Housing 10 has cassette-receiving well 12 with a front opening and a hand-receiving recess 13 to facilitate removal of a cassette ejected from the operating position but still remaining in well 12. A pair of upstanding spool spindles 14 and 15 slidably receive hubs of spools within the cassette to be used with the player and then drive the spools, respectively. In a single-spool cartridge, only one spindle is used. Actuating push button 16 moves transducer 17 and pinch roller 18 from a tape-engaging (operating) position to a tape-disengaged position (loading) and then substantially simultaneously releases ejection member 22 for upward movement through aperture 24 to eject cartridge 35 from its operating position. A pair of cassette holddown members 83 and 84 are movably mounted within well 12 and actuated via a linkage connected to ejector member 22.

The illustrated cassette player operates with tape-containing cassette 35 having a pair of coplanar reels (not shown) with spindle-receiving hubs (not shown) and a tape-opening window (not shown) for permitting operative engagement between transducer 17, pinch roller 18, and the tape in the cassette. Additionally, an aperture in cassette 35 receives rotatable capstan 19 for moving the tape between the spools. A spool drive means (not shown) rotates drive spindles 14 and 15 in coordinated action while simultaneously rotating capstan 19 in the appropriate direction for transporting the tape between the spools. Signal-processing circuits (not shown) are electrically connected to transducer 17 for effecting transducing operations with magnetic tape in cassette 35. Other devices associated with magnetic tape signal processing may be added in a practical embodiment.

Insertion of cassette 35 over spool spindles 14 and 15 engages ejection member 22 and urges it downwardly into its ejection actuable (operating) position. Downward movement of member 22 moves ejection member arm 25 to disengage stop surface 23 thereon from a corresponding surface on connecting link 27. This release allows the later-described spring-urged mechanism to move transducer 17 and pinch roller 18 into operative engagement with tape in cassette 35 as well as moving push button 16 upwardly to a release actuable position. Ejection member 22 has depending shaft 22A engaged to arm 25.

The interconnecting linkages are centered about and are all actuated by main pivot member 36. Member 36 is pivoted about a vertical axis 36A and includes a bell crank portion extending radially outwardly along one diameter. First linkage means 37 operatively interconnects main pivot member 36 to pivot transducer 17 between tape-engaging (operating) position and a tape-disengaged (loading or ejection) position. Second linkage means 38 operatively connects main pivot member 36 to ejector member 22. This consists of a portion of member or connecting link 27 which is shared with first linkage means 37 and a portion of ejection member arm 25 as will be fully described later. Third linkage means 39 operatively connects main pivot member 36 to push button 16 for moving the push button to a release actuable position (operating) and receives actuation from push button 16 for moving main pivot member 36 to the loading or ejection position. Fourth linkage means 40 connects main pivot member 36 to pinch roller 18 for pivoting same between an operating (tape-engaging) position and a loading or ejection position wherein pinch roller 18 is disengaged from the tape.

First linkage means provides a direct action connection between main pivot member 36 and transducer 17; that is, there is no lost motion between pivoting action in either direction. Transducer 17 is mounted on arm 42 secured to pivot rod 43 for pivoting about axis 43A parallel to the pivot axis of main pivot member 36. Arm 44, secured at the lower-end portion of pivot rod 43 (remember views are inverted), is pivotally connected to connecting link 27. Connecting link 27 in turn is pivotally secured to a radial-outward end portion of main pivot member 36. During cassette loading, main pivot member 36 is pivoted in the direction of arrow 46 pivoting arm 44 in the direction of arrow 47 to move transducer 17 into tape-engaging relationship with tape in such cassette. During cassette ejection, main pivot member 36 and arm 44 pivots in the opposite sense moving transducer 17 into a tape-disengaging position.

Second linkage means includes outwardly extending portion 57 on connecting link 27. While in the loading or ejection position, portion 57 is engaged against edge 23 of ejector member arm 25. This engagement locks all mechanisms in the loading position. Push button 16 cannot be actuated. Spring 70 (FIG. 4) urges button 16 upwardly and main pivot member 36 to rotate in a direction of arrow 46, thereby holding edge 23 and member 27 together. As cassette 35 is inserted into well 13, it engages the upper portion ejector member 22. Continued loading of cassette 35 depresses ejector member 22 separating edge 23 from member 25 freeing main pivot member 36 for pivoting. Spring 70 pivots main pivot member 36 in the direction of arrow 46. This pivoting moves portion 57 intermediate ejector arm 25 end portion 52 and housing 10 retaining ejector 22 in the depressed or operating position (FIG. 2); that is, ejector member 22 is not higher than the cassette-receiving platform 12A for permitting cassette 35 to remain in its operating position. This latter action does not occur until cassette 35 has substantially reached its operating position such that transducer 17 is pivoted into operating engagement with the tape and pinch roller 18 pivots into operating engagement via fourth linkage means 40 with cassette 35 being substantially in the operating position.

To eject cassette 35, push button 16 is depressed actuating third linkage means 39 rotating main pivot member 36 in a direction opposite to arrow 46. This pivoting moves portion 49 from portion 52 freeing it and member 22 to move upwardly for ejecting cassette 35.

Figure 2:
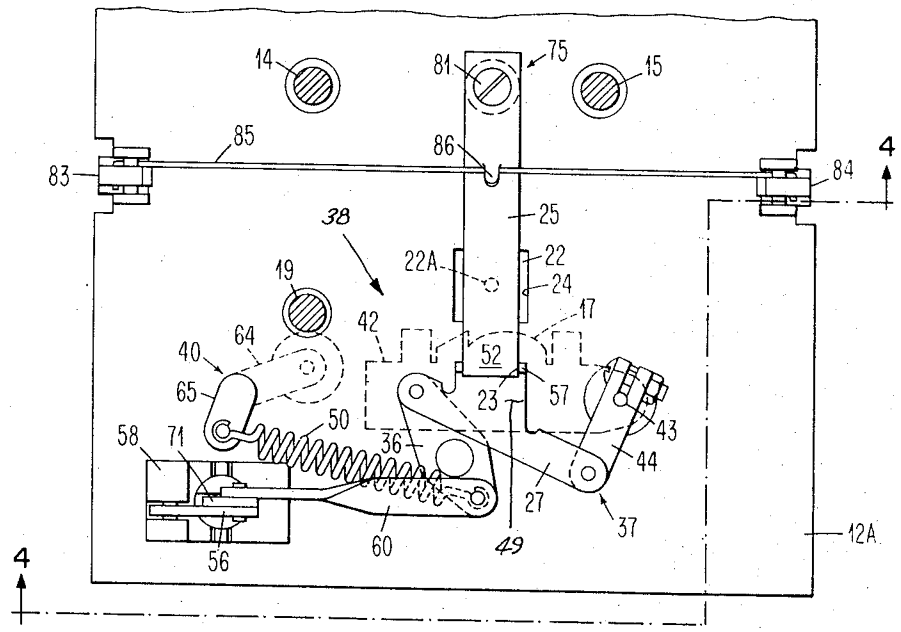
FIGS. 2 and 3 are simplified inverted plan views of the FIG. 1 illustrated player with bottom portions removed to show the mechanisms therein constructed in accordance with the present invention, respectively in the operating and loading positions.
Figure 3:
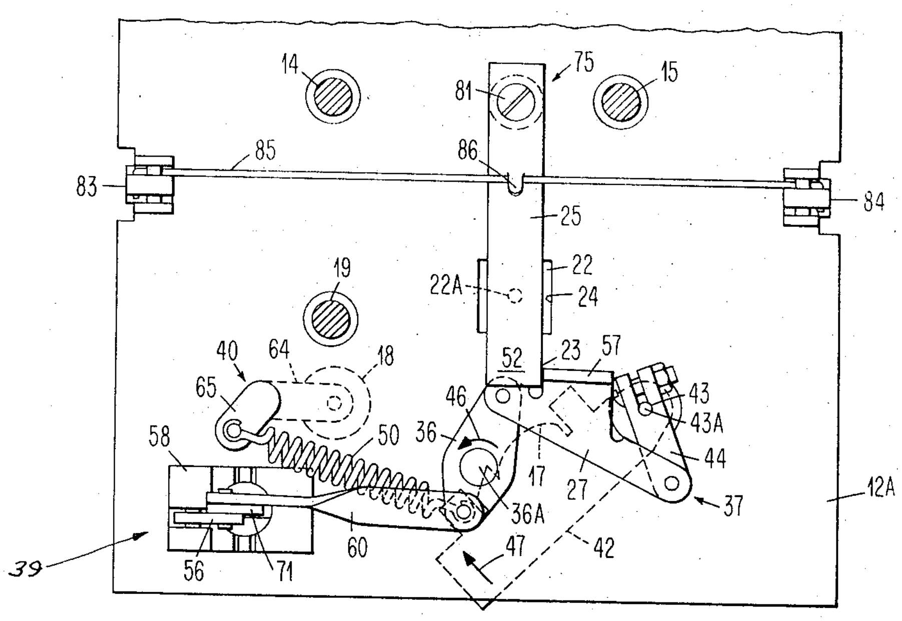

Third linkage means includes arm 56 pivotally mounted on depending boss 58. Push button 16 has depending shank 59 pivotally secured to the radial outward end of intermediate arm 71. Connecting link 60 has opposite ends respectively pivotally secured to main pivot member 36 arm 56 and intermediate arm 71 to depending shank 59 as best seen in FIG. 4. During loading, spring 70 urges main pivot member 36 to pivot in the direction of arrow 46. This action moves connecting link 60 in the direction of arrow 61 which extends the distance between pivot rod 62 and boss 58. Therefore, both arms 60 and 56 move upwardly along with push button 16 to its release actuable position under spring 70 urging. During this motion, connecting link 60 slides toward platform 12A on pivot rod 62. Depression of push button 16 pivots arm 56 and connecting link 60 downwardly. This downward pivoting urges main pivot member 36 to rotate in a direction opposite to that of arrow 46 which then effects the actions described for the first and second linkage means. During the ejection motion, connecting link 60 slides downwardly on pivot rod 62 away from the platform 12A.

Fourth linkage means 40 includes extension spring 50 and arm 65 which translates spring 50 urging to pinch roller pivot rod 63. Pinch roller 18 is secured on the upper side of platform 12A to mounting arm 64 which in turn is mounted on pivot rod 63. Spring 50, through its extension, provides lost motion between main pivot member 36 and actuation of pinch roller 18 into operative engagement with the tape. In the loading position, spring 50 is fully compressed and pinch roller 18 is disengaged from the tape. Pivoting main pivot member 36 in the direction of arrow 46 permits spring 50 to extend and urge pinch roller 18 into its tape-engaging position. Once main pivot member 36 has reached its operating position, spring 50 provides through its extension forces a spring-urged force on pinch roller 18 against tape in cassette 35. During cassette ejection, depression of push button 16 rotates pivot member 36 opposite to arrow 46 compressing spring 50. The compression of spring 50 provides lost motion between movement of transducer 17 away from the tape and pinch roller 18 away from the tape. Spring 50 permits pinch roller 18 to remain against tape in the cassette until it is fully compressed at which time spring 50 acts like a connecting rod positively moving pinch roller 18 away from the tape. This enables push button 16 to have a detent (not shown) for permitting high-speed rewind in that partial depression of push button 16 moving transducer 17 away from the tape-operating position; yet pinch roller 18 remains in control. Connecting link 27 only moves part way thereby holding ejector member 22 in its operating position. After a high-speed rewind, push button 16 can be released from the detent to return to its release actuable position. Complete depression of push button 16 disengages pinch roller 18 and releases ejector member 22.

Spring ejection of cassette 35 occurs when member 27 is moved out from under ejector member arm 25. Spring 80 located at 75 yieldably urges arm 25 against head 81 of depending bolt 82. This urging causes arm 25 to be approximately horizontal, corresponding to the loading position with ejector member 22 extending above platform 12A. Spring 80 is deformed during cassette insertion by arm 25 pivoting about head 81 as end portion 52 rides over depending end portion 51 of member 27. This stored energy is released by depressing push button 16 to eject cassette 35.

A pair of cassette holddowns 83 and 84 are pivotally mounted on opposite sides of platform 12A. Wire 85 connects the two holddowns and is retained in catch 86 in arm 25. Wire 85 is bent at each end to yieldably bias holddowns 83 and 84 outwardly to be free of cassette 35. Arm 25, moving downward during cassette insertion, tightens wire 85 pivoting holddowns 83 and 84 to the operating or holddown positions shown in FIGS. 2 and 4.

Ejector member 22, shank 22A, and arm 25 may be constructed of a unitary upwardly biased leaf spring; for example, the leaf spring can be fixed at 75 with an upstanding bend (not shown) movable through aperture 24 for engaging cassette 35. A free end of such a spring can replace end portion 52 of arm 25.

Extension spring 50 may be replaced by linkage bars having lost motion (as by a pin movable in a slot).

While the invention has been particularly shown and described with reference to preferred embodiments thereof, it will be understood by those skilled in the art that various changes in form and details may be made therein without departing from the spirit and scope of the invention.

What is claimed is:

1. A cassette tape player having a frame, an operating member on the frame and pivotally movable to and from a tape engaging position for selective operation with a tape in a tape spool containing cassette insertable into the player, the frame having a cassette-receiving well with a planar bottom cassette-supporting wall platform for receiving the cassette and having a central aperture, spool driving means stationarily mounted on said frame and having rotatable spindle means extending into said well through said platform for rotating said tape spool for transporting tape past the operating member, the improvement including the combination:

a main pivot member pivotally mounted on said frame under the platform opposite said well and having a pivot axis substantially perpendicular to said planar platform and pivotable between loading and operating positions, first linkage means operatively connecting said main pivot member to said operating member for coordinated pivoting action therebetween, a cassette-ejector member mounted on said platform and movable through said central aperture in a reciprocating manner, means yieldably urging said cassette-ejector member into said well into a loading position, said cassette-ejector member having an operating position outside said well in said central aperture corresponding to said tape engaging position of said operating member, second linkage means having operating and loading positions operatively connecting said cassette-ejector member and said main pivot member including lost motion such that a given movement of said main pivot member effects cassette ejection as said second linkage means moves from said operating to said loading position by said cassette-ejector member moving through said central aperture to said loading position and including locking means for locking said cassette-ejector member in said operating position against movement into said well, and third linkage means including ejection actuation apparatus operatively connected to said main pivot member and including spring urging means for imparting said given movement to said members for moving same to the operating positions for coordinating movements between said main pivot member and said ejection actuation apparatus and said ejector member and for selectively locking and releasing said locking means.

2. The player set forth in claim 1 wherein said main pivot member is a bell crank having one radial outward end portion connected to said third linkage means and another outward radial end portion connected to said first linkage means and to said second linkage means, said tape engaging means including a transducer, the player further having a pinch roller on said frame and movable to and from a tape engaging position, and fourth linkage means including an extension spring connecting said main pivot member one outward end portion to said pinch roller, said extension spring being compressed for acting as a rigid rod when said pinch roller is in a tape disengaged position corresponding to said main pivot member being out of said operating position whereby the pinch roller is moved away from a tape transport path and said extension spring being extensible for spring urging said pinch roller into tape engaging relationship whenever said main pivot member is in said operating position.

3. The apparatus set forth in claim 2 wherein said main pivot member, said first linkage means, and said fourth linkage means are all essentially movable in a coplanar manner such that the depth from said platform of said linkage means is minimized.

4. The apparatus set forth in claim 3 further including a single member pivotally connecting said main pivot member to both said first and second linkage means and including a depending flange having first and second locking edges respectively for lockingly engaging said second linkage means respectively in the loading and operating positions, a pivot rod, said operating member being pivoted about said pivot rod and including an arm fixedly secured to said pivot rod and pivotally secured to said single member with the depending flange, and said second linkage means including an arm movable toward and away from said platform for respectively moving said ejector member through said platform between said loading and operating positions and having a free-end portion selectively lockingly engageable with said first and second locking edges.

5. A cassette tape player having a housing, said housing having a cassette-receiving platform with a small aperture therein, including in combination:

a head pivotally mounted on a rod for movements between tape engaging and loading positions, means for positioning a cassette in an operating position with respect to said head, cassette engaging means movably disposed in said housing for reciprocating movements through said apertures, a main pivot member having a pivot axis disposed substantially perpendicular to the broad extent of the cassette when in said operating position and movable between loading and operating positions, spring means operatively connected between said main pivot member and said housing for urging said main pivot member to said operating position, means operatively connecting said cassette engaging means to said main pivot member for coordinate movements such that said cassette engaging means extends through and beyond said operative position when said main pivot member is in said loading position and retracted into said housing when said main pivot member is in said operating position, a pinch roller, a mount supporting said pinch roller for moving same between tape engaging and loading positions and pivotally secured on said housing, an actuating arm fixedly secured to said mount, an extension spring extending between said main pivot member and said actuating arm such that when the main pivot member is in said loading position, the extension spring is compressed for urging said pinch roller into the loading position and when said main pivot member is in said operating position, said extension spring being extended for yieldably urging said pinch roller into operative engagement with a cassette in said operating position, a push button on the upper side movably extending through said housing and having a shank extending inside said housing, a first arm inside said housing and pivotally secured to said housing and having a free end portion, a second arm having opposite end portions respectively pivotally secured to said shank and said free end portion, a connecting link extending between said main pivot member and one of said arms, a depending pivot rod on said main pivot member slidably and pivotally receiving one end of said connecting link such that as the main pivot member pivots between said loading and operating positions, said connecting link slides axially on said pivot rod for varying the distance between said depending shank and said end portion of the main pivot member, and all said means and said main pivot member disposed being substantially coplanar.

6. The subject matter set forth in claim 5 further including a pinch roller, a mount supporting said pinch roller for movement between tape engaging and loading positions and pivotally secured on said housing, an actuating arm fixedly secured to said mount, an extension spring extending between said main pivot member and said actuating arm such that when the main pivot member is in said loading position, the extension spring is compressed for urging said pinch roller into the loading position and when said main pivot member is in said operating position, said extension spring being extended for yieldably urging said pinch roller into operative engagement with a cassette in said operating position, said housing having an aperture on an upper side portion, a push button on said upper side portion and movably extending through said housing aperture and having a shank extending inside said housing, an arm inside said housing and pivotally secured between said housing and said shank, a connecting link extending between said main pivot member and said pivoted arm, a depending pivot rod on said main pivot member slidably and pivotally receiving one end of said connecting link such that as said main pivot member pivots between said loading and operating positions, said connecting link slides axially on said pivot rod for varying the distance between said depending shank and said end portion of the main pivot member, a linking arm, said main pivot member having one radial outward portion connected to said linking arm and pivoting means operatively associated with said head and including a depending flange having first and second locking edges, and a spring urged arm movably disposed on the inside of said housing, an ejection member operatively connected to said spring urged arm for ejecting a cassette and constituting said means responsive to cassette insertion for pivoting said head and being moved between said first and second locking edges of said depending flange for establishing first and second stable states corresponding to said loading and operating positions and the linkage being such that when the push button is depressed, the depending flange slides on said spring urged arm to a disengaged position for permitting same to spring urge said ejector member for ejecting the cassette and then engaging the first of said locking edges.

7. A cassette insertion and ejection mechanism operable with a cassette tape player having a cassette receiving platform and having first and second planar surface portions with an aperture therein, an ejector member movably disposed through said aperture between loading and operating positions, an ejector arm movably secured on said second surface portion in operative engagement with said ejector member and movable therewith, a head pivotally secured on said first surface portion including a pivot rod extending through the platform to said second surface portion, spring means biasing said head to an operating position from a loading position, linkage means on said second surface portion of said platform and having a main pivot member for pivoting between loading and operating positions, a connecting arm pivotally secured to said main pivot member and movable therewith for coordinated action between the head and said connecting arm, a depending flange on said connecting arm having a first locking edge engaging one side of said arm and a second locking edge engaging the side of said arm facing said second surface portion for locking the mechanism between first and second positions corresponding respectively to loading and operating positions such that insertion of a cassette moves said ejector member and said ejector arm away from said second surface freeing said one side from said first locking edge for permitting the transducer to move into operative engagement by said spring biasing, and cassette ejection actuation means operatively connected to said connecting arm for selectively moving same such that said second locking edge becomes disengaged from said ejector arm and spring means urging said ejector arm for moving the ejector member to eject the cassette and simultaneously engage an edge of said ejector arm with said first locking edge.

8. The apparatus set forth in claim 7 further including a pinch roller selectively movable between tape engaging and loading positions and pivotally secured to said first surface portion on a pivot rod extending past said second surface portion and having an actuating arm spaced from said second surface portion, an extension spring interconnecting said actuating arm and said connecting arm such that when said apparatus is in the loading position, said spring is compressed to force said pinch roller into said loading position and when said apparatus is in the operating position, the spring urging of the extension spring urges said pinch roller into said operating position.

* * * * *